(12) United States Patent
Joo

(10) Patent No.: US 11,949,801 B2
(45) Date of Patent: Apr. 2, 2024

(54) LEDGER VERIFIABLE-PRUNING SYSTEM

(71) Applicant: BLOOM TECHNOLOGY, INC., Seongnam-si (KR)

(72) Inventor: Young Hyun Joo, Yongin-si (KR)

(73) Assignee: BLOOM TECHNOLOGY, INC., Seongnam-si (KR)

( * ) Notice: Subject to any disclaimer, the term of this patent is extended or adjusted under 35 U.S.C. 154(b) by 296 days.

(21) Appl. No.: 17/627,139

(22) PCT Filed: Jul. 21, 2020

(86) PCT No.: PCT/KR2020/009588
§ 371 (c)(1),
(2) Date: Jan. 14, 2022

(87) PCT Pub. No.: WO2021/020794
PCT Pub. Date: Feb. 4, 2021

(65) Prior Publication Data
US 2022/0278858 A1   Sep. 1, 2022

(30) Foreign Application Priority Data
Aug. 1, 2019   (KR) .......................... 10-2019-0093684

(51) Int. Cl.
*H04L 9/00*   (2022.01)
*H04L 9/08*   (2006.01)

(52) U.S. Cl.
CPC .............. *H04L 9/50* (2022.05); *H04L 9/0836* (2013.01)

(58) Field of Classification Search
CPC .................................................... H04L 9/50
See application file for complete search history.

(56) References Cited

U.S. PATENT DOCUMENTS

2014/0245020 A1     8/2014   Buldas
2017/0353309 A1*   12/2017   Gray ...................... G06F 21/51
(Continued)

FOREIGN PATENT DOCUMENTS

| KR | 10-1937188 B1 | 4/2019 |
|----|---------------|--------|
| WO | 2019-116248 A1 | 6/2019 |

OTHER PUBLICATIONS

International Search Report for PCT/KR2020/009588 dated Jan. 5, 2021 from Korean Intellectual Property Office.
(Continued)

*Primary Examiner* — Bradley W Holder
(74) *Attorney, Agent, or Firm* — Revolution IP, PLLC

(57) ABSTRACT

A ledger verifiable pruning system includes a skewed Merkle tree production module in which according to a linked list scheme, root hash value $R_{n-1}$ of a previous sub-tree is included in data block $T_n$, data block $T_n$ in which root has value $R_{n-1}$ is included is hashed, thereby obtaining $h(T_n)$, obtained $h(T_n)$ and root hash value $R_{n-1}$ of the previous sub-tree are summated and then hashed, thereby obtaining $h(h(T_n)|R_{n-1})$, and obtained $h(h(T_n)|R_{n-1})$ is successively added to respective nodes of a binary Merkle tree structure to expanding and produces a skewed Merkle tree.

7 Claims, 9 Drawing Sheets

(56) References Cited

U.S. PATENT DOCUMENTS

2018/0082296 A1\* 3/2018 Brashers .............. H04L 9/3236
2018/0189878 A1\* 7/2018 Uhr .................... G06Q 20/3829
2019/0034465 A1\* 1/2019 Shimamura ........... G06Q 20/02
2019/0243986 A1 8/2019 Uhr et al.

OTHER PUBLICATIONS

Woo, Seung, "Skewed Merkle Trees", Jun. 21, 2018.
Vig, Saru et al., "Customizing Skewed Trees for Fast Memory Integrity Verification in Embedded Systems", 2017 IEEE Computer Society Annual Symposium on VLSI (ISVLSI). 2017.

\* cited by examiner

【FIG. 1】
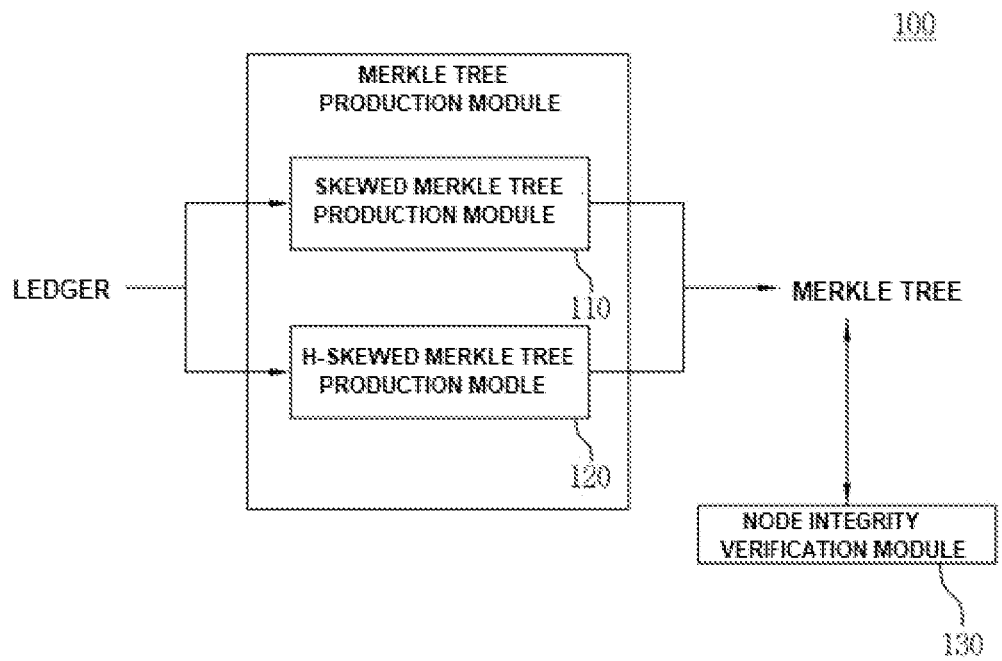
【FIG. 2】
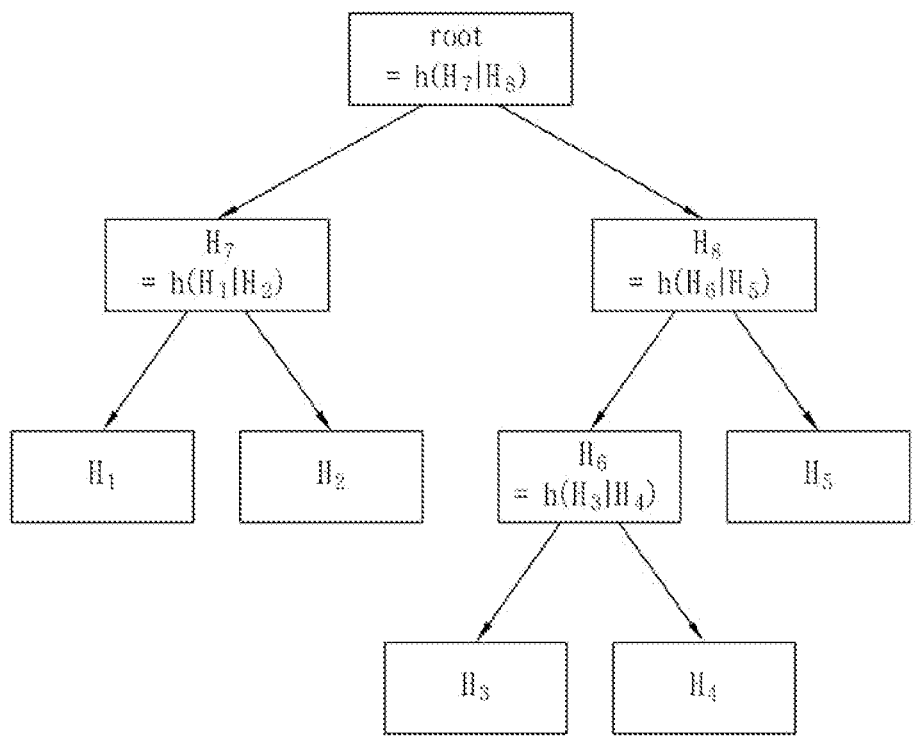

[FIG. 3]
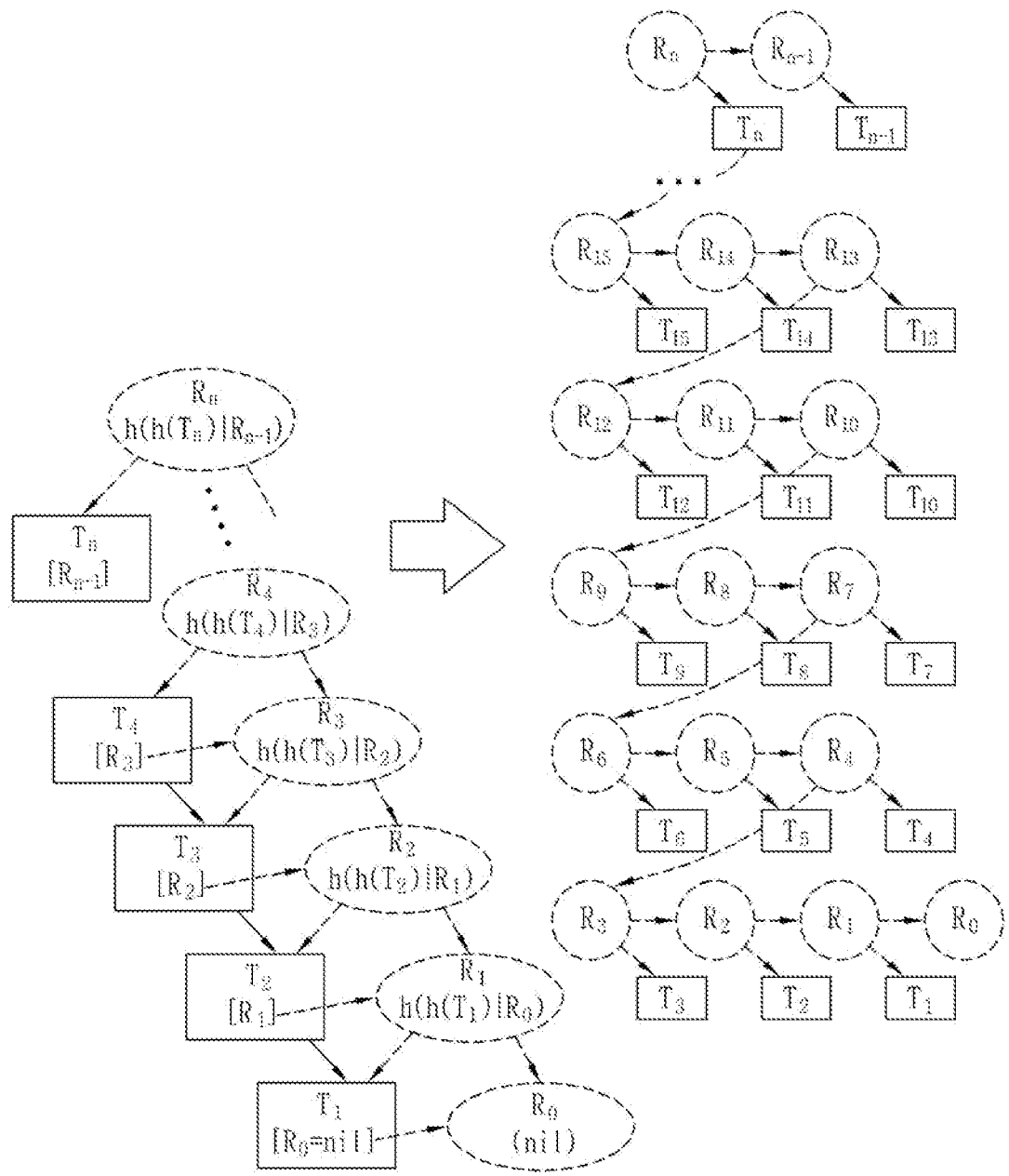

[FIG. 4]
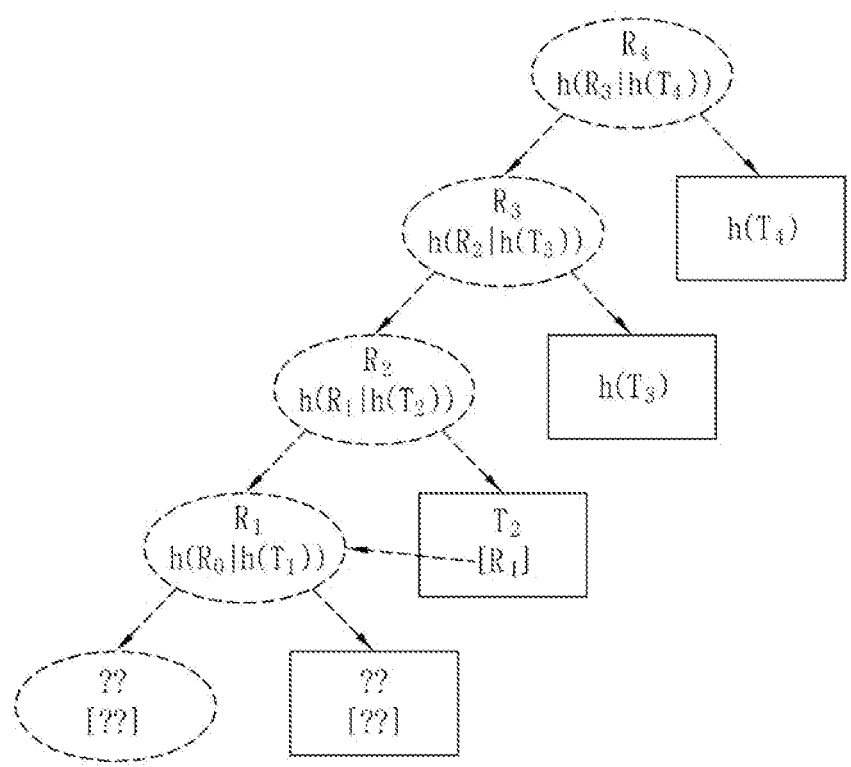

[FIG. 5]
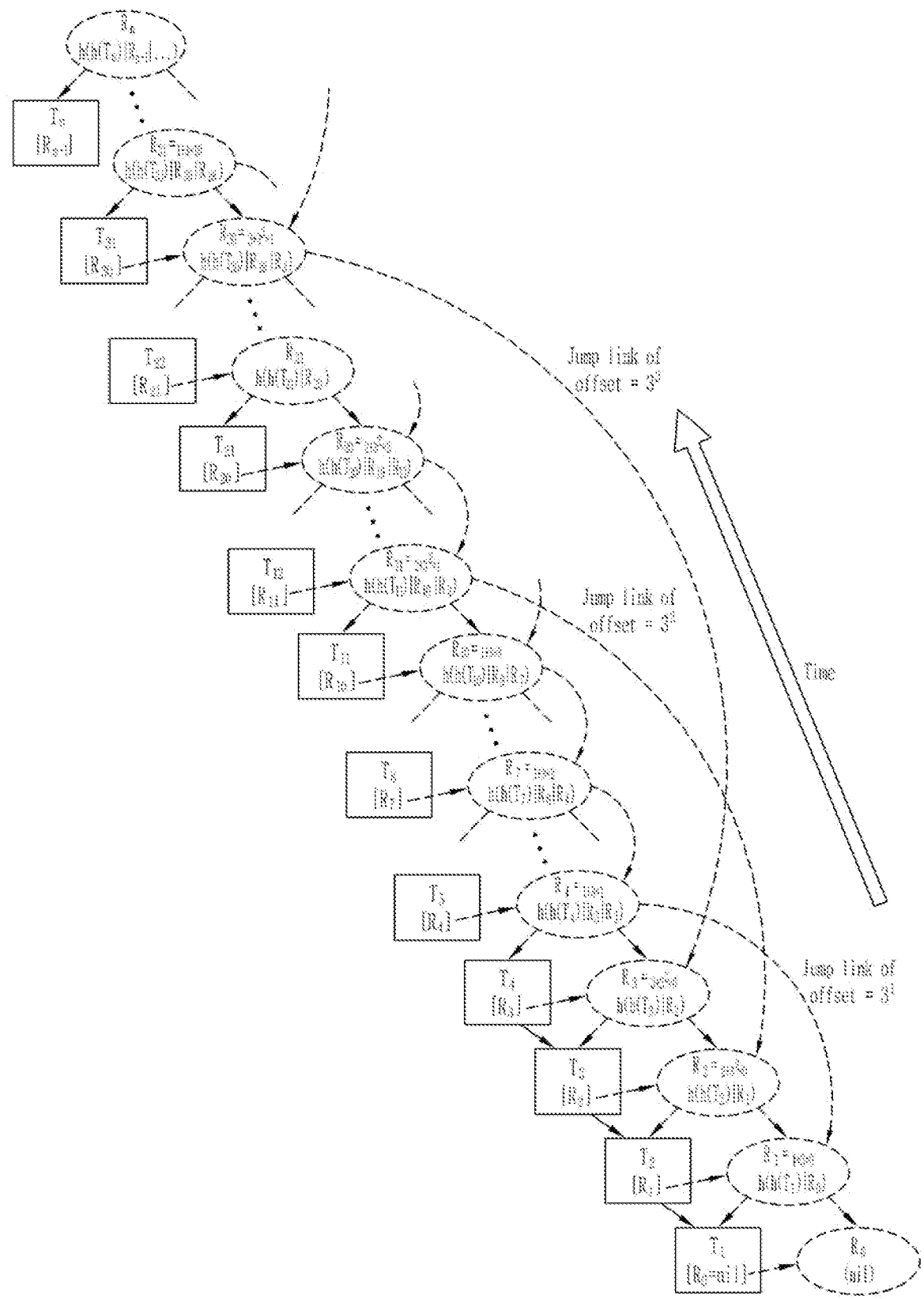

【FIG. 6】
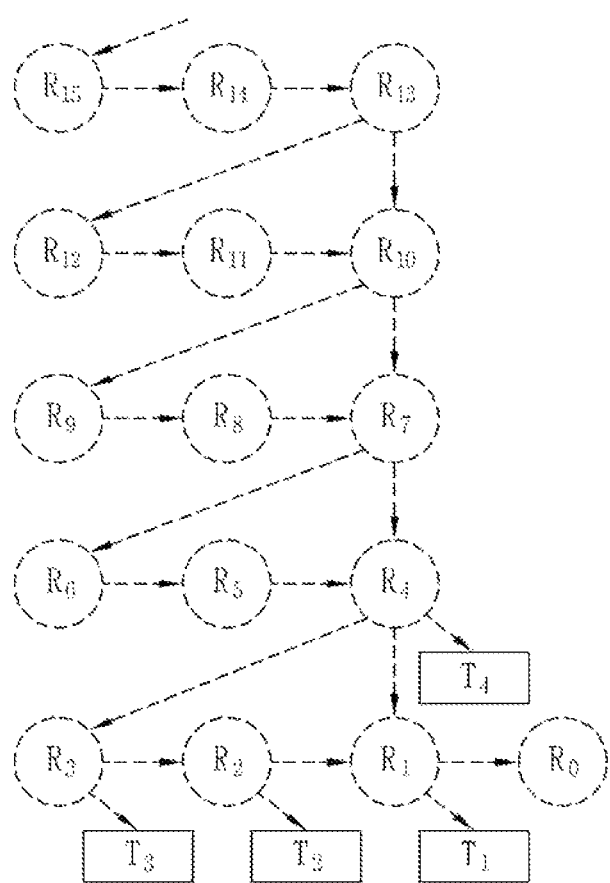

[FIG. 7]
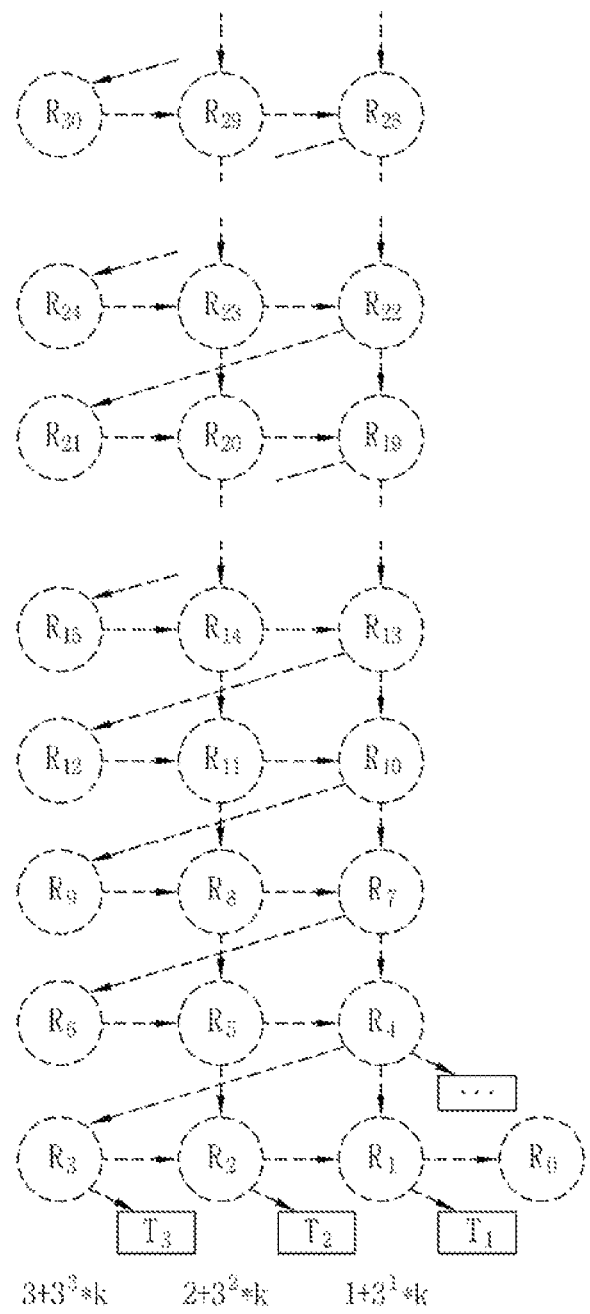

[FIG. 8]
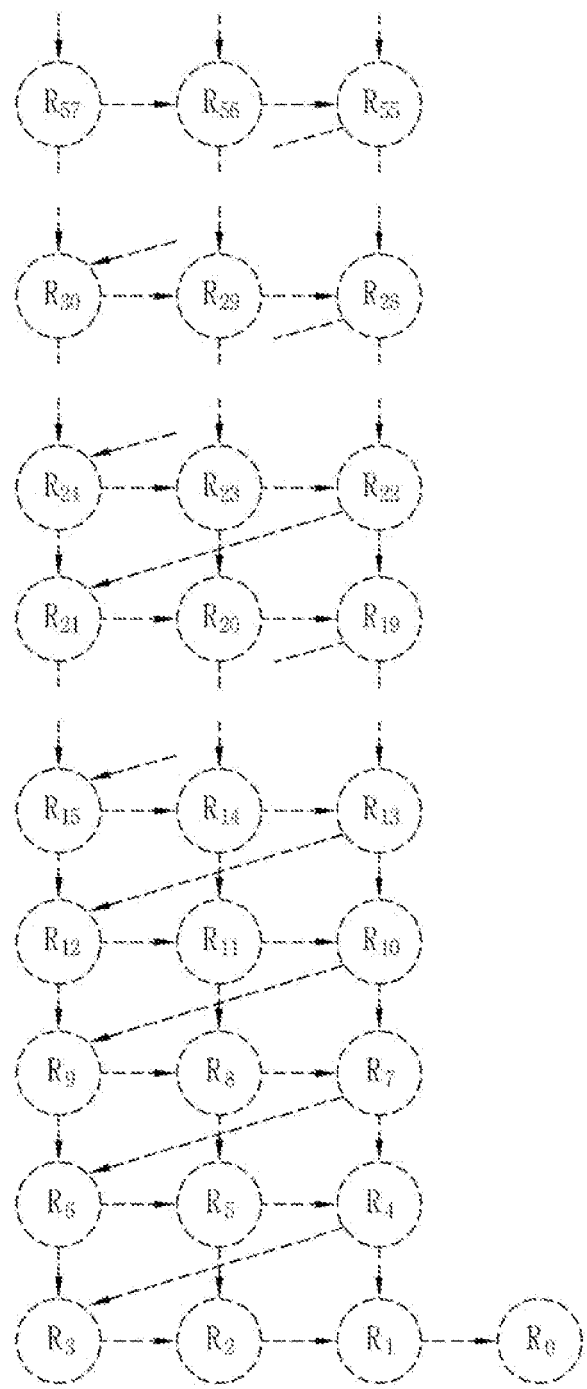

[FIG. 9]
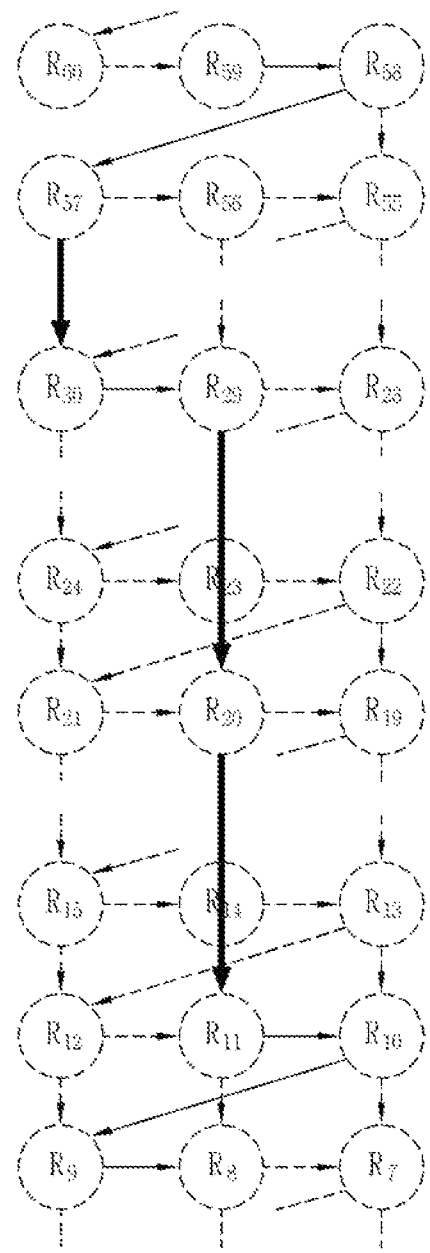

[FIG. 10]
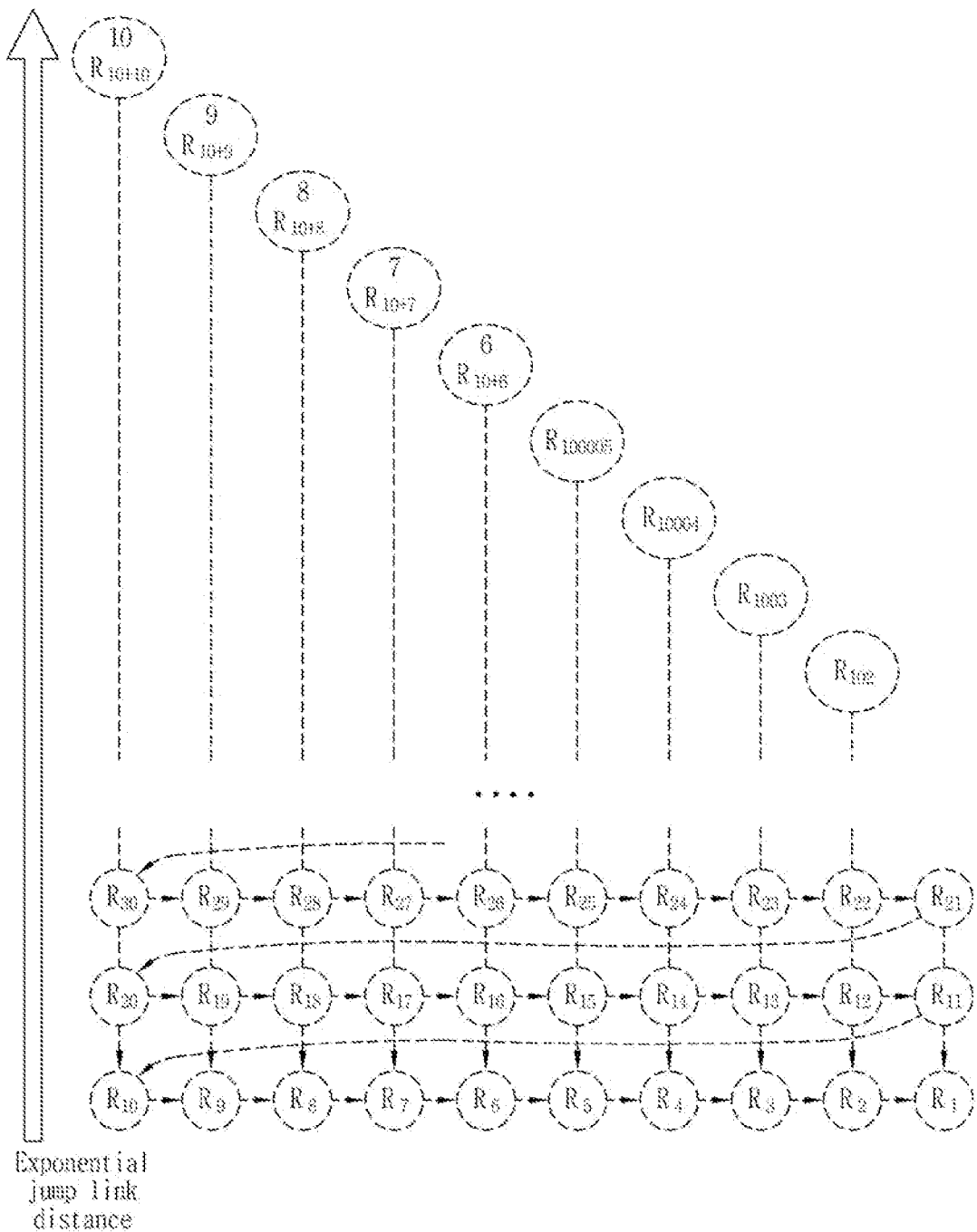

LEDGER VERIFIABLE-PRUNING SYSTEM

TECHNICAL FIELD

The present invention relates to a ledger pruning system, and particularly, to a ledger verifiable pruning system.

BACKGROUND ART

In respect to a distributed ledger such as an existing blockchain or a directed acyclic graph (DAG), a ledger size increases over time, and as a result, an insufficient storage becomes a big problem.

With the development of speeding technology, a shortage phenomenon of a storage capacity becomes a bigger problem.

At present, ethereum has a processing speed of 20 transactions (Tx)/sec and bitcoin has a processing speed of 7 Tx/sec. In the case of the ethereum, data of 250 GB is accumulated yearly.

In the future, the ethereum may have a higher transaction processing speed. For example, in a directed acyclic graph (DAG)-account-wise transaction chain (AWTC) ledger mechanism which has an even higher processing speed of the transaction than the blockchain, it is also possible to set a goal of 4 kTx/sec in the future.

In the transaction processing speed of 4 kTx/sec, a size of the distributed ledger produced daily as 0.5 kByte/Tx*4 kTx/sec*60 sec/min*60 min/hour*24 hours/day becomes 172.8 GB/day.

When data 172.8 GB is accumulated every day in all nodes, there is a problem in that a numerous capacity of storage should be secured as time goes by.

In a ledger structure having a high transaction processing speed, a problem in utilization of the storage with a cumulative increase in ledger size cannot but become a bigger problem.

The ethereum having a low processing speed performs pruning that deletes data before several years ago, and each node possesses only data after several years ago. In respect to the pruned data, a mechanism is used, in which old data which is separately managed by a foundation and distributed every time a request is received.

Therefore, there may be a limit in efficient ledger management only with the existing pruning.

DISCLOSURE

Technical Problem

An object of the present invention is to provide a ledger verifiable pruning system.

Technical Solution

According to a first embodiment, a ledger verifiable pruning system may be configured to include a skewed Merkle tree production module in which according to a linked list scheme, root hash value $R_{n-1}$ of a previous sub-tree is included in data block $T_n$, data block $T_n$ in which root has value $R_{n-1}$ is included is hashed, thereby obtaining $h(T_n)$, obtained $h(T_n)$ and root hash value $R_{n-1}$ of the previous sub-tree are summated and then hashed, thereby obtaining $h(h(T_n)|R_{n-1})$, and obtained $h(h(T_n)|R_{n-1})$ is successively added to respective nodes of a binary Merkle tree structure to expanding and produces a skewed Merkle tree.

Here, the ledger verifiable pruning system may be configured to further include a node integrity verification module in which a latest root hash value of the skewed Merkle tree is calculated by sequentially executing a hash value operation by using the $T_k$ and a predetermined root hash value $h(T_i)$ (here, k<i<=n) of the skewed Merkle tree in order to verify whether a past predetermined data block $T_k$ is included in the skewed Merkle tree and it is compared whether the calculated latest root hash value and a previously known latest root hash value match to inspect the integrity of the block $T_k$.

According to a second embodiment, a ledger verifiable pruning system may be configured to include a hierarchical (h)-skewed Merkle tree production module in which according to a linked list scheme, root hash value $R_{n-1}$ of a previous sub-tree is included in data block $T_n$, data block $T_n$ in which root has value $R_{n-1}$ is included is hashed, thereby obtaining $h(T_n)$, obtained $h(T_n)$ and root hash value $R_{n-1}$ of the previous sub-tree and a jump link $R_{n-(base^{offset})}$ are summated and then hashed, thereby obtaining $h(h(T_n)|R_{n-1}|R_{n-(base^{offset})})$, and obtained $h(h(T_a)|R_{n-(base^{offset})})$ is successively added to respective nodes of a binary Merkle tree structure to expand and produce an h-skewed Merkle tree.

Here, the jump link $R_{n-(base^{offset})}$ may be a root hash value on a node at a predetermined past time on the h-skewed Merkle tree, the base may be a shortest distance of a predetermined jump link in order to allocate the jump link at a predetermined interval, and the offset may be a location n % base of a current node.

In addition, a distance of the jump link may be configured to be obtained by a $base^{offset}$ value.

Meanwhile, the h-skewed Merkle tree production module may be configured to allocate the jump link every node of offset+$(base^{offset})$*k.

In this case, the k may be configured by a positive integer.

On the other hand, the ledger verifiable pruning system may be configured to further include a node integrity verification module in which a latest root hash value of the h-skewed Merkle tree is calculated by sequentially executing a hash value operation by using the $T_k$ and a predetermined root hash value $h(T_i)$ (here, k<i<=n) of the h-skewed Merkle tree in order to verify whether a past predetermined data block $T_k$ is included in the h-skewed Merkle tree and it is compared whether the calculated latest root hash value and a previously known latest root hash value match to inspect the integrity of the block $T_k$.

Here, the node integrity verification module may be configured to verify whether a hash value $R_y$ or a data block $T_y$ exists in the h-skewed Merkle tree according to the following procedure, and 1) searching a jump link or a link (node) which exists at a most past time among links (nodes) which is the same time as or more future than $R_y$ based on a link (node) within a predetermined distance in a past time direction from a latest root hash value $R_{head}$, 2) searching a jump link or a link (node) which exists at a most past time among links (nodes) which is the same time as or more future than $R_y$ based on a link (node) within a predetermined distance in a past time direction from a hash value of a jump link or a link which exists in the searched most past time, 3) repeating process 2) until reaching the $R_y$, 4) calculating root hashes directed in a future direction sequentially for a set of the jump link or the link (node) searched repeatedly in processes 2) and 3) by using the $T_y$, and 5) comparing whether a finally obtained root hash value is equal to the $R_{head}$, and verifying that the hash value $R_y$ or the data block $T_y$ exists in the h-skewed Merkle tree when the finally obtained root hash value is equal to the $R_{head}$ as a comparison result.

Here, the predetermined distance may be a base.

Advantageous Effect

According to the ledger verifiable pruning system, a ledge structure is configured by a skewed Merkle tree to store and manage only latest data, and an integrity of a transaction submitted by the other node is configured to be proved, and as a result, there is an effect that an increase in ledger size can be minimized and maintained.

In particular, there is an effect that the skewed Merkle tree is configured to be converted into an upgraded h-skewed Merkle tree to manage the ledger to remarkably reduce a size of proof data which increases over time. With the reduction in size of the proof data, integrity inspection of old data of several years ago is enabled by a smaller number of operation steps to further increase an inspection speed.

Moreover, in the h-skewed Merkle tree, hash values calculated by two or more operation routes are configured to be compared with each other to verify whether the hash values are equal to each other to verify whether a newly added jump link is forged.

DESCRIPTION OF DRAWINGS

FIG. 1 is a block diagram of a ledger verifiable pruning system according to an embodiment of the present invention.

FIG. 2 is a structural diagram of an existing Merkle tree.

FIGS. 3 and 4 are conceptual diagrams of a skewed Merkle tree production algorithm according to an embodiment of the present invention.

FIGS. 5 throguh 10 are conceptual diagrams of an h-skewed Merkle tree production algorithm according to an embodiment of the present invention.

BEST MODE

The present invention may have various modifications and various embodiments and specific embodiments will be illustrated in the drawings and described in detail in specific contents for carrying out the present invention. However, this does not limit the present invention to specific embodiments, and it should be understood that the present disclosure covers all the modifications, equivalents and replacements included within the idea and technical scope of the present invention. In describing each drawing, reference numerals refer to like elements.

Terms including as first, second, A, B, and the like are used for describing various constituent elements, but the constituent elements are not limited by the terms. The terms are used only to discriminate one component from another component. For example, a first component may be referred to as a second component, and similarly, the second component may be referred to as the first component without departing from the scope of the present invention. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

Terms used in the present application are used only to describe specific embodiments, and are not intended to limit the present disclosure. A singular form includes a plural form if there is no clearly opposite meaning in the context. In the present application, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, a preferred embodiment of the present invention will be described in detail with reference to the accompanying drawings.

FIG. 1 is a block diagram of a ledger verifiable pruning system according to an embodiment of the present invention, FIG. 2 is a structural diagram of an existing Merkle tree, FIGS. 3 and 4 are conceptual diagrams of a skewed Merkle tree production algorithm according to an embodiment of the present invention, and FIGS. 5 through 10 are conceptual diagrams of an h-skewed Merkle tree production algorithm according to an embodiment of the present invention.

First, referring to FIG. 1, a ledger verifiable pruning system according to an embodiment of the present invention may be configured to include a skewed Merkle tree production module 110, a hierarchical (h)-skewed Merkle tree production module 120, and a node integrity verification module 130.

In general, a Merkle tree is also referred to as a hash tree, and has a tree data structure configured by a cryptographic hash value.

As illustrated in FIG. 2, the Merkle tree is used for verifying that a hash value (e.g., $H_6$, $H_7$, $H_8$, root) for any data (e.g., $H_1$, $H_2$, $H_3$, $H_4$, $H_5$) is included in the Merkle tree. That is, the verification is made by calculating the hash value along a route up to a root node. When a final calculation value matches a root hash value, the verification is made. For example, in order to inspect $H_1$, the verification is made when a result of calculating and inspecting the hash value along the route by using $H_2$ and $H_8$ matches the root hash value, the verification is made.

However, in using the verification mechanism using the Merkle tree, a data size of the hash value ($H_6$, $H_7$, $H_8$, root) is small, but original data ($H_1$, $H_2$, $H_3$, $H_4$, $H_5$) may have a relatively very large data size.

The ledger verifiable pruning system performs pruning that deletes old data by using the skewed Merkle tree structure upgraded from such an existing general Merkle tree structure other than such an existing general Merkle tree structure and the h-skewed Merkle tree structure further upgraded from the skewed Merkle tree structure, and is configured to perfectly verify the integrity of the old data only with the upgraded Merkle tree structure.

In the skewed Merkle tree structure, each node may inspect the integrity of all data while possessing recent data, e.g., only data for one day.

When it is assumed that the distributed ledger system has a transaction processing speed of 4 kTx/sec per day, only data of 172.8 GB which is data accumulated for one day is kept and all remaining previous data are pruned and the pruned data is configured to perfectly inspect the integrity by using the kept data, i.e., the root hash value of the skewed Merkle tree.

In addition, in the h-skewed Merkle tree structure, very old data of several years or more has an even shorter proof length than in the skewed Merkle tree structure. The size of the proof data increases as time goes by, but in the present invention, the size of the proof itself is reduced to reduce an operation burden assigned to the inspection and reduce even a time required for the inspection.

Referring back to FIGS. 1 and 3, a skewed Merkle tree production module 110 may be configured to generate a skewed Merkle tree of a binary Merkle tree structure by using data blocks.

The skewed Merkle tree production module 110 may be configured to generate a skewed Merkle tree having a form of a binary Merkle tree structure in which a data block $T_n$ and a root hash value $R_{n-1}$ of a previous sub tree are paired.

An initial data block $T_1$ and the root hash value $R_{n-1}$ are stored in each node of the skewed Merkle tree.

The skewed Merkle tree production module 110 may be configured to calculate the root hash value of each node by $h(h(T_n)|R_{n-1})$ and sequentially store the root hash value in each node to extend and generate the skewed Merkle tree.

The skewed Merkle tree production module 110 may be configured to first make the root hash value $R_{n-1}$ of the previous sub tree in a newly produced data block Tn according to a linked list mechanism.

In addition, $h(T_n)$ is calculated by hashing $T_n$, the calculated $h(T_n)$ and the root hash value $R_{n-1}$ of the previous sub tree are added, and then hashed again to calculate $h(h(T_n)|R_{n-1})$. $h(h(T_n)|R_{n-1})$ is sequentially stored in the skewed Merkle tree.

That is, the skewed Merkle tree may be regarded as a combination of the linked list and the binary Merkle tree.

In FIG. 3, the hash value $R_1$ is a hashed value by adding $T_1$ which is a first data block and a root hash initial value $R_0$. In addition, a hash value $R_2$ is a value acquired by hashing $T_2$ which is a second data block and a most recent root hash value $R_1$. Since the most recent root hash value $R_1$ is included in $T_2$ by the linked list mechanism, $T_2$ and $R_1$ are hashed to calculate $R_2$. $R_2$ is added to a data block $T_3$ by such a mechanism to extend and generate the skewed Merkle tree by repeating such a process.

Meanwhile, the node integrity verification module 130 of FIG. 1 may be configured to verify the integrity for a past specific node on the skewed Merkle tree.

In FIG. 4, in order to verify whether $T_2$ is included in the skewed Merkle tree, R4 included in $T_4$ is acquired from $T_4$ which is a latest data block of the skewed Merkle tree. In addition, for the verification, $R_1$ included in $T_2$ is acquired from given $T_2$. In addition, $h(T_2)$ is calculated by hashing $T_2$ and when $R_1$ and $h(T_2)$ are added and hashed, $R_2$ may be calculated.

Here, if a hash value $h(T_3)$ of $T_3$ is previously known, $R_3$ may be calculated by the same mechanism, and if $h(T_4)$ is also previously known, $R_4$ may be calculated by using $R_3$. If the calculated $R_4$ is equal to $R_4$ acquired above, it may be verified that a corresponding node is a node $T_2$ to be verified is included in the skewed Merkle tree.

That is, the verification of $T_2$ is enabled if only $h(T_3)$ and $h(T_4)$ are known in the skewed Merkle tree.

When this is generalized and applied, the node integrity verification module 130 may verify the integrity of $T_k$ if only the latest root hash value $R_n$ and a hash value $h(T_1)$ (here, k<l<=n) of a data block in an intermediate step are previously known in order to verify the data block $T_k$ of a specific node in the skewed Merkle tree.

In this case, another data block in the intermediate step need not be known previously, and any data block or hash value before $T_k$ need not be known.

In the skewed Merkle tree structure, even though each node does not directly possess all data blocks, it is possible to verify the integrity of the data only with several small hash values. This largely contributes even to a load reduction of a network.

However, the skewed Merkle tree also has a disadvantage. Since each node of the skewed Merkle tree possesses only the hash value of a sub tree immediately before according to the linked list mechanism, each one should be calculated and computed for all nodes as illustrated in FIG. 4 in a verification process. The skewed Merkle tree is advantageous in verifying recent data, but the number of operation steps increases for hundreds of billions of transactions in units of several years, and as a result, a calculation load increases. In order to complement this, the h-skewed Merkle tree may be used.

As illustrated in FIG. 5, the h-skewed Merkle tree production module 120 of FIG. 1 is configured to further possess information on a root hash value of a node a long time ago as well as each node possesses the root hash value immediately before. The root hash value of the node a long time ago as a link that refers to the past tree is defined as a jump link. That is, the jump link is a past root hash value.

As illustrated in FIG. 5, the jump link has a distance between exponential nodes, and a long operation step required for the verification is omitted to enable verification of the data block of the past jump link immediately. That is, the proof size is reduced and the number of operation steps is remarkably reduced to rapidly verify even a node several years ago.

Each node value Rn of the h-skewed Merkle tree which further possesses the jump link of FIG. 5 may be organized as $h(h(T_a)|R_{n-1}|R_{n-(base^{offset})})$.

Here, $R_{n-(base^{offset})}$ represents a jump link which is a hash value of a node at any past time.

A base in the jump link is a shortest distance of a predetermined jump link in order to allocate the jump link at a predetermined interval. If the base is 3, the jump link is allocated at an interval of three nodes.

In addition, an offset is a remainder value of a value acquired by a location n of a current node by the base, i.e., n % base.

In addition, a distance dist from the location n of the current node up to the jump link may be calculated as a $base^{offset}$ value.

FIG. 5 illustrates a jump link in which the base is 3 and the offset is 1.

Referring to FIG. 5, the distance of the jump link as $base^{offset}$, i.e., $3^1$ is 3.

Referring to a node $R_4$, it can be seen that a value of $R_4$ may be obtained by adding and hashing the hash value of $T_4$ and the hash value $R_3$ immediately before, and the jump link $R_1$.

FIG. 6 illustrates a jump link in which the base is 3 and the offset is 2.

In FIG. 6, it can be seen that the distance of the jump link as $3^2$ becomes 9.

However, the jump link need not be allocated to all nodes in which the offset is 2. As illustrated in FIG. 7, the jump link may be allocated only to a node offset+(base$^{offset}$)*k at the node location n. Herein, k represents a positive integer. The jump link may not be allocated to a node other than the above node.

As illustrated in FIG. 7, if the base is 1 and the offset is 1, 1+$3^1$*k and the jump link is allocated to $R_{19}$, $R_{13}$, $R_{10}$, $R_7$, $R_4$, $R_1$. In addition, if the base is 3 and the offset is 2, 2+$3^2$*k and the jump link is allocated to $R_n$, $R_{11}$, $R_2$. If the base is 3 and the offset is 3, the jump link will be allocated to $R_{57}$, $R_{30}$, $R_3$.

FIG. 8 illustrates a state in which the allocation of the jump link of FIG. 7 is completed. The allocation of the jump link is repeatedly performed until each offset reaches the base.

Meanwhile, the verification of the block may be performed as follows.

In a situation in which the root hash value has $R_x$ and any intermediate hash value may be accessed in the h-skewed Merkle tree, the following procedure is followed in order to verify whether a data block $T_y$ or an upper node $R_y$ is included in the h-skewed Merkle tree.

1) Based on a link (node) as long as an appropriate distance (e.g., the base) in a past time direction from a latest root hash value, a most past jump link or a general link which is equal to $R_y$ or is in the future is searched.

2) Based on a link (node) as long as an appropriate distance (e.g., the base) in a past time direction again from a hash value of the searched jump link or general link, a most past jump link or a general link which is equal to $R_y$ or is in the future is searched. This process is repeated until reaching $R_y$.

3) A root hash is calculated, which is directed to a future direction sequentially for a set of the searched links by using $T_y$. If a final calculation result is equal to $R_{head}$, the verification is completed and it is verified that $R_{head}$ exists in the h-skewed Merkle tree.

FIG. 9 illustrates that $R_8$ is found in order to inspect $T_8$ starting from $R_{59}$.

Referring to FIG. 9, $R_{head}$ is $R_{59}$, links (nodes) $R_{58}$ and $R_{57}$ as large as an appropriate distance in $R_{59}$, i.e., the distance of the base of 3 refer to values, and a most past link $R_{30}$ which is more future than $R_8$ is searched and inquired among the jump links of a distance of the offset of 3 from $R_{57}$, i.e., $3^3$.

Here, a link (node) $R_{29}$ as large as the appropriate distance, i.e., the distance of the base of 3 is inquired again. A jump link of the distance of the offset of 2, i.e., $3^2$ and a jump link $R_{11}$ of the jump link $R_{20}$ are searched and inquired from $R_{29}$ again. The jump link $R_{11}$ becomes a most past link which is more future than $R_8$ among the jump links of the offset of 2 based on $R_{29}$.

In addition, each of links $R_{10}$, $R_9$, and $R_8$ within an appropriate distance is searched from $R_{11}$ again to finally reach $R_8$.

In addition, the root hash value is sequentially calculated in the future direction again by using $T_8$ to be inspected. If the finally calculated root hash value matches $R_{59}$ on the h-skew Merkle tree, it is verified that $T_8$ exists in the h-skew Merkle tree.

In this process, a total of 9 operation steps are required from $R_8$ to $R_9$, $R_{10}$, $R_{11}$, $R_{20}$, $R_{29}$, $R_{30}$, $R_{57}$, $R_{58}$, and $R_{59}$. However, when the jump link is not used, all nodes of $R_8$ to $R_{59}$ should be computed, and as a result, a total of 51 operation steps are required. It can be seen that the operation steps are remarkably reduced, and when the size of the ledger increases, a significant computation amount and a significant computation time may be reduced.

FIG. 10 as an actual implementation example illustrates an h-skewed Merkle tree in which the base is 10. Since the jump link is $10^{offset}$, the distance of the jump link increases to 10, $10^2$, and $10^3$, and when the distance is 1999, reaching is possible only by 28 steps.

As such, since the ledger verifiable pruning system can perfectly inspect data only with the hash value in spite of not directly possessing all data blocks, a storage amount of data can be remarkably reduced. When the size of the ledger also enormously increases as time goes by, a search and an operation using the jump link are acutely required.

The present invention has been described with reference to the exemplary embodiments. However, it will be appreciated by those skilled in the art that various modifications and changes of the present invention can be made without departing from the spirit and the scope of the present invention which are defined in the appended claims and their equivalents.

The invention claimed is:

1. A ledger verifiable pruning system comprising:
   a skewed Merkle tree production module in which according to a linked list scheme, root hash value $R_{n-1}$ of a previous sub-tree is included in data block $T_n$, data block $T_n$ in which root has value $R_{n-1}$ is included is hashed, thereby obtaining $h(T_n)$, obtained $h(T_n)$ and root hash value $R_{n-1}$ of the previous sub-tree are summated and then hashed, thereby obtaining $h(h(T_n)|R_{n-1})$, and obtained $h(h(T_n)|R_{n-1})$ is successively added to respective nodes of a binary Merkle tree structure to expanding and produces a skewed Merkle tree.

2. The ledger verifiable pruning system of claim 1, further comprising:
   a node integrity verification module in which a latest root hash value of the skewed Merkle tree is calculated by sequentially executing a hash value operation by using the $T_k$ and a predetermined root hash value $h(T_i)$ (here, k<i<=n) of the skewed Merkle tree in order to verify whether a past predetermined data block $T_k$ is included in the skewed Merkle tree and it is compared whether the calculated latest root hash value and a previously known latest root hash value match to inspect the integrity of the block $T_k$.

3. A ledger verifiable pruning system comprising:
   a hierarchical (h)-skewed Merkle tree production module in which according to a linked list scheme, root hash value $R_{n-1}$ of a previous sub-tree is included in data block $T_n$, data block $T_n$ in which root has value $R_{n-1}$ is included is hashed, thereby obtaining $h(T_n)$, obtained $h(T_n)$ and root hash value $R_{n-1}$ of the previous sub-tree and a jump link $R_{n-(base^\wedge offset)}$ are summated and then hashed, thereby obtaining $h(h(T_n)|R_{n-1}|R_{n-(base^\wedge offset)})$, and obtained $h(h(T_n)|R_{n-1}|R_{n-(base^\wedge offset)})$ is successively added to respective nodes of a binary Merkle tree structure to expand and produce an h-skewed Merkle tree,
   the jump link $R_{n-(base^\wedge offset)}$ is a root hash value on a node at a predetermined past time on the h-skewed Merkle tree,
   the base is a shortest distance of a predetermined jump link in order to allocate the jump link at a predetermined interval, the offset is a location n % base of a current node, and a distance of the jump link is configured to be obtained by a base$^{offset}$ value.

4. The ledger verifiable pruning system of claim 3, wherein the h-skewed Merkle tree production module is configured to allocate the jump link every node of offset+(base$^{offset}$)*k, and the k is configured by a positive integer.

5. The ledger verifiable pruning system of claim 3, further comprising:

a node integrity verification module in which a latest root hash value of the h-skewed Merkle tree is calculated by sequentially executing a hash value operation by using the $T_k$ and a predetermined root hash value $h(T_i)$ (here, k<i<=n) of the h-skewed Merkle tree in order to verify whether a past predetermined data block $T_k$ is included in the h-skewed Merkle tree and it is compared whether the calculated latest root hash value and a previously known latest root hash value match to inspect the integrity of the block $T_k$.

6. The ledger verifiable pruning system of claim 5, wherein the node integrity verification module is configured to verify whether a hash value $R_y$ or a data block $T_y$ exists in the h-skewed Merkle tree according to the following procedure, and 1) searching a jump link or a link (node) which exists at a most past time among links (nodes) which is the same time as or more future than $R_y$ based on a link (node) within a predetermined distance in a past time direction from a latest root hash value $R_{head}$,
2) searching a jump link or a link (node) which exists at a most past time among links (nodes) which is the same time as or more future than $R_y$ based on a link (node) within a predetermined distance in a past time direction from a hash value of a jump link or a link which exists in the searched most past time,
3) repeating process 2) until reaching the $R_y$,
4) calculating root hashes directed in a future direction sequentially for a set of the jump link or the link (node) searched repeatedly in processes 2) and 3) by using the $T_y$, and
5) comparing whether a finally obtained root hash value is equal to the $R_{head}$, and verifying that the hash value $R_y$ or the data block $T_y$ exists in the h-skewed Merkle tree when the finally obtained root hash value is equal to the $R_{head}$ as a comparison result.

7. The ledger verifiable pruning system of claim 6, wherein the predetermined distance is a base.

* * * * *